United States Patent [19]

Wavre

[11] 4,150,275
[45] Apr. 17, 1979

[54] APPARATUS FOR CONTROLLING THE RELATIVE MOTION OF THE ELECTRODES IN ELECTRICAL DISCHARGE MACHINING

[75] Inventor: Alain Wavre, Geneva, Switzerland

[73] Assignee: Ateliers des Charmilles S.A., Geneva, Switzerland

[21] Appl. No.: 837,767

[22] Filed: Sep. 29, 1977

[30] Foreign Application Priority Data

Oct. 1, 1976 [CH] Switzerland .................. 12438/76

[51] Int. Cl.$^2$ ............................................. B23P 1/08
[52] U.S. Cl. ................................ 219/69 V; 219/69 G; 318/39; 318/571
[58] Field of Search ............... 219/69 V, 69 G, 69 M, 219/69 E; 318/571, 39; 235/151.11

[56] References Cited

U.S. PATENT DOCUMENTS

| Re. 26,970 | 10/1970 | Bentley et al. | 219/69 V |
|---|---|---|---|
| 3,809,852 | 5/1974 | Weber | 219/69 V |
| 4,041,268 | 8/1977 | Bradeau et al. | 219/69 V |
| 4,057,703 | 11/1977 | Pfau | 219/69 V |

FOREIGN PATENT DOCUMENTS 2410335 11/1975 Fed. Rep. of Germany ........... 219/696

Primary Examiner—Bruce A. Reynolds
Attorney, Agent, or Firm—Hauke and Patalidis

[57] ABSTRACT

A control system, in an EDM machine, for simultaneously displacing the electrode tool and the electrode workpiece relative to each other along both an axis of penetration of the electrode tool into the workpiece and a translation motion in a plane perpendicular to the axis of penetration of the electrode tool into the workpiece. The control system consists of logic circuitry providing a variable signal obtained by integrating as a function of time the difference between a signal representative of the machining condition and a reference signal, apportioning the variable signal between a first and a second electrical signal and interrelating the apportionment with a control of the relative position of the electrodes along the axis of penetration and of the eccentricity of the relative translation movement, respectively, as a function of the first electrical signal and of the second electrical signal.

6 Claims, 4 Drawing Figures

APPARATUS FOR CONTROLLING THE RELATIVE MOTION OF THE ELECTRODES IN ELECTRICAL DISCHARGE MACHINING

BACKGROUND OF THE INVENTION

The present invention relates to apparatus for machining, by electro-erosive electrical discharges, an electrode workpiece by means of an electrode tool, the apparatus comprising means for relatively displacing the electrodes along the axis of relative penetration of the electrode tool into the electrode workpiece and along the motion of an electrode relative to the other effected in a plane normal to that axis of penetration.

Control of the relative feed motions of the electrodes, in an EDM machine, can be obtained by way of several well known methods.

One of such methods consists in feeding the electrode tool into the electrode workpiece while simultaneously increasing progressively the eccentricity of the translation motion such as to provide in the electrode workpiece a cavity having a shape substantially corresponding to the geometry of the electrode workpiece. Such method is accomplished, for example, by means of an apparatus as disclosed in U.S. Pat. No. Re. 26,970.

Another known method consists in varying the amount of eccentricity of the translation motion simultaneously with the penetration of the electrode tool into the workpiece, such as to provide the lateral surface of the workpiece with a shape different from that of the electrode tool. The apparatus disclosed, for example, in U.S. Pat. No. 3,539,754 permits to vary the eccentricity of the translation motion proportionally to the machining axial progression such as to provide the lateral surface of the workpiece with a predetermined taper.

Another known method consists in effecting a three-dimensional extension of the electrode tool by causing the electrode tool to describe a translation motion inscribed on a hemisphere. Such a method, which permits to increase the precision of machining, is achieved by means of a structure such as described in the published German patent application No. 2,410,335.

Until the present invention each of those methods could be accomplished only by means of separate specific machining control arrangements, and it was necessary to shift equipment each time a user wanted to shift machining method. The novel control system for the electrodes of an EDM machine, according to the present invention, permits to operate according to any one of the machining processes briefly described hereinbefore, without requiring any change of equipment. The present invention provides means for obtaining a variable signal or value obtained by means, known in themselves, consisting in integrating, relative to time, the difference between a signal or value representative of the machining conditions and a reference signal or value, and by providing means for apportioning, or dividing, the signal or value thus obtained into a first and a second electrical signal or value, means for balancing the apportionment and means for controlling the relative position of the electrodes both along the axis of penetration of the electrode tool within the electrode workpiece and the amount of eccentricity of the translation motion, respectively, as a function of the first electrical signal or value and as a function of the second electrical signal or value.

One of the many advantages of the invention is to permit to control at will the direction in which the translation motion is effected, in a manner which is simple, precise and economical, and to achieve a permanent control of the relative position of the electrodes in all directions selected between the direction of the axis of penetration of the electrode tool into the electrode workpiece and the directions perpendicular to the axis of the penetration. More particularly, the present invention is well adapted for use in cooperation with mechanical motion translation drivers having an eccentricity whose amount is controlled by a single servo motor.

BRIEF DESCRIPTION OF THE DRAWING

The accompanying drawing represents, in a schematic manner and for illustrative purposes only, two examples of practical embodiments of the present invention. In the drawing.

DETAILED DESCRIPTION OF THE PREFERRED EMBODIMENTS

Figure 1:
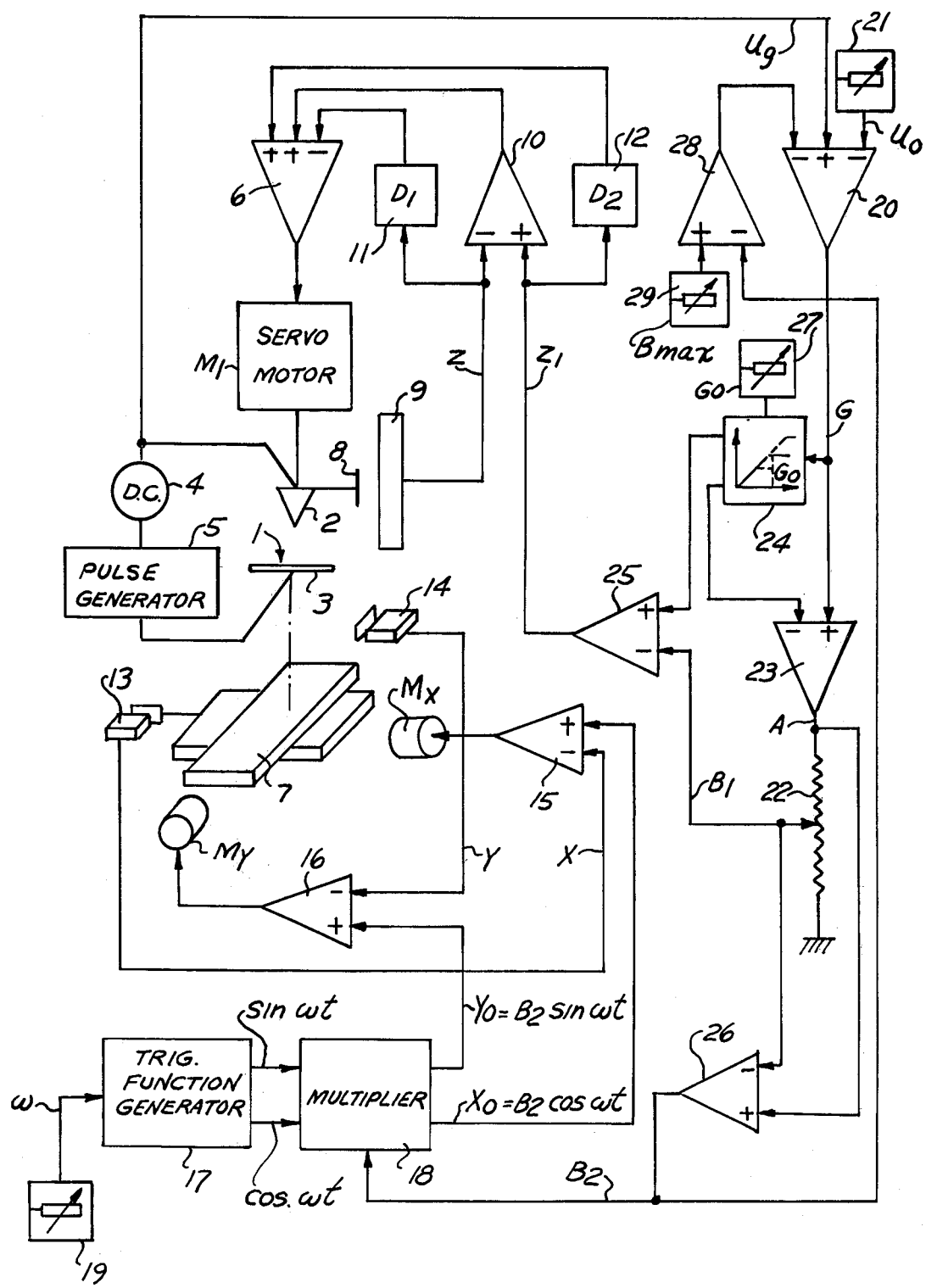
FIG. 1 is a schematic circuit diagram of a first embodiment.

In the schematic circuit diagram of FIG. 1, electrical discharges are caused to occur in the machining zone 1 between an electrode tool 2 and an electrode workpiece 3, the electrical discharges being obtained from an electrical circuit comprising principally a source of direct current 4 and a pulse generator 5, as is well known in the EDM art.

The linear motion of the electrode tool 2, while being fed towards and into the workpiece 3, is achieved by means of a first servo motor M1, at a speed which is controlled by the signal appearing at the output of a differential amplifier 6. The workpiece 3 is mounted on a table 7 which is subjected to linear displacement along two axes at a right angle forming a plane normal to the axis of penetration of the electrode tool into the workpiece, the motion of the cross slides being controlled by the servo motors Mx and My.

The instantaneous axial position of the electrode tool 2 is monitored by a position transducer comprising a moveable element 8 displaceable in unison with the electrode tool 2 and a stationary element 9 which supplies an electrical signal Z which is representative of the axial position of the electrode tool 2 relative to the workpiece 3. The position indicating signal Z is applied to one of the inputs of a differential amplifier 10 having another input accepting a reference signal $Z_1$ and an output connected to one of the inputs of the differential amplifier 6, such as to control the axial or longitudinal position of the electrode tool 2 as a function of the difference or error between the signals Z and $Z_1$.

The two other inputs of the differential amplifier 6 accept, in addition, the signal appearing at the output of a first differentiator 11, which may take the form of an operational amplifier (op. amp.) used in a differentiation mode and which supplies at its output a signal representative of the speed at which varies the signal Z, and the signal at the output of a second differentiator 12 which is representative of the speed at which varies the signal $Z_1$. Those output signals are compared in the differential amplifier 6 and are used to modify the output signal from the differential amplifier 10, such as to improve the dynamic response of the controls for the servo motor $M_1$ while avoiding hunting and unstability.

The position of the table 7 is monitored along each axis by way of one of a pair of position transducers 13 and 14. The position transducer 13 supplies a signal x representing the position of the table 7 along the X-axis which is compared to a reference signal $x_o$ by means of a comparator 15, taking the form of an op. amp. for example, whose output signal controls the servo motor $M_x$ of the table 7. In a similar manner, the servo motor $M_y$ of the table 7 is controlled as a function of a signal y supplied at the output of the position transducer 14 and a reference signal $Y_o$, the two signals being compared in a comparator 16.

For displacing the table 7 according to a circular translation motion, or orbiting motion, the signals $x_o$ and $y_o$ each vary according to a trigonometric function established by a calculating circuit 17 relative to an angular velocity $\omega$. To that effect, variable signals, such as $\sin\omega$ and $\cos\omega$, are developed by the trigonometric function generator circuit 17 and are multiplied by a value $B_2$ proportional to the translation motion amplitude in a multiplier circuit 18, which supplies at its output respectively the signals $x_o$ and $y_o$ controlling in turn the cross-axed position of the table 7. The angular velocity $\omega$ is determined by the setting of a reference circuit 19. The angular velocity may also be made during the translation cycles according to the method disclosed in the published German patent application No. 2,550,649, or it may be corrected as a function of a motion radius, such as to maintain the tangential translation velocity at a predetermined value.

The command signals determining the relative positions of the electrodes along the axis of penetration and the amount of eccentricity of the translation motion are obtained from a comparator circuit 20 providing an output signal G which is a function of the integral of the difference between a value $U_g$, representing the machining conditions, for example the machining voltage, and a reference value $U_o$ set by means of a potentiometer 21. The signal G is applied to the input of a voltage divider 22 through a differential amplifier 23 adapted to supply at its output a signal A equal to the difference between the signal G and the signal appearing at the output of the circuit 24, to whose input is also applied the variable signal G.

The voltage A at the input of the voltage divider 22, consisting of a potentiometer, is divided by means of the potentiometer slider into a voltage $B_1$ which is added to the signal appearing at the other output of the circuit 24 by means of a differential amplifier 25 supplying at its output the reference signal $Z_1$. The difference between the voltage $B_1$ and the voltage A, at the input of the potentiometer 22, is measured by a subtractor 26 which supplies at its output a reference signal $B_2$ for the eccentricity of the translation motion.

By displacing the position of the slider of the potentiometer 22, there results a change in the ratio between the values $B_1$ and $B_2$ for the purpose of orienting the translation motion in all directions comprised between the direction of the axis of penetration ($B_1 = A$; $B_2 = O$) and the directions which are perpendicular to that axis ($B_2 = A$; $B_1 = O$). The circuits 23, 24 and 25 are arranged such as to permit to define the reference point of penetration of the electrode tool into the workpiece from which the amount of eccentricity of the translation motion begins to vary as a function of the position command signal G. Up to a value $G_o$ of the command signal, which is adjustably determined by means of a potentiometer 27, the output signals from the circuit 24 are inverted and equal in amplitude to the input command signal G. Because of the subtractor 23, the signals A, $B_1$ and $B_2$ are equal to O and the signal $Z_1$ is equal to G, such that the relative motion of the electrodes is effected only along the axis of penetration.

As soon as the value $G_o$ is reached, the value of the signal A, which is equal to the difference $G-G_o$, is divided between the value $B_1$ and a value $B_2$ by the potentiometer 22, such as to give to the position command signal $B_1$ the value $G_o + B_1$ and to the command signal $B_2$ the value $G_o-B_1$. The differential amplifier 28 receives at one of its inputs the eccentricity command signal $B_2$ and at its other input a reference signal $B_{max}$ controllably adjusted by means of a potentiometer 29. As soon as the value of the reference signal is reached, the amplifier 28 provides at its output a signal which is applied to one of the inputs of the integrator circuit 20 such as to limit the eccentricity to that value.

Figure 2:
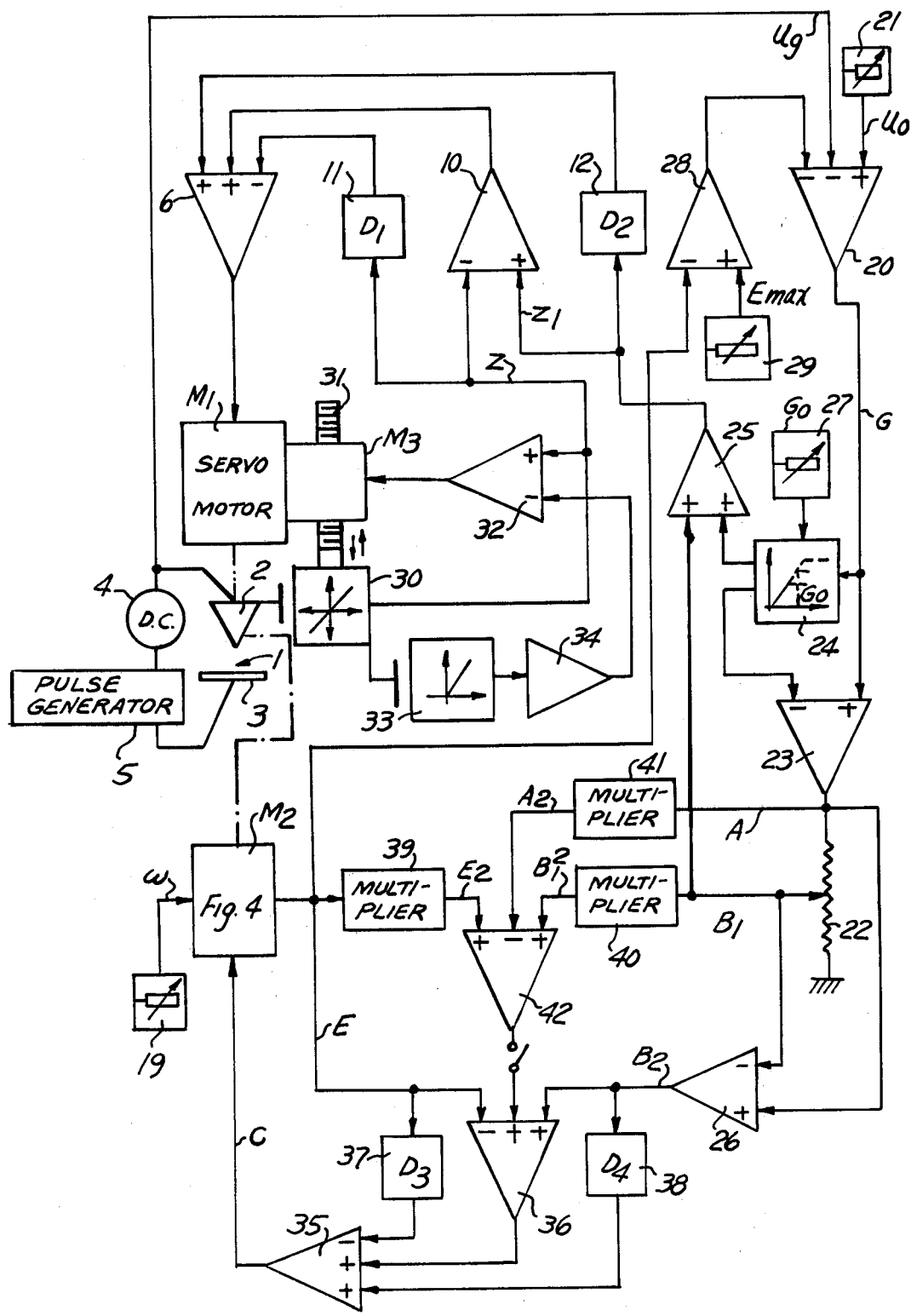
FIG. 2 is a schematic circuit diagram of a second embodiment.

The second embodiment of the invention, which is illustrated at FIG. 2, comprises the same elements as represented at FIG. 2 for the control of the axial position of the electrode tool 2 and for the development of the command signals $B_1$ and $B_2$. In the embodiment of FIG. 2, the monitoring of the axial displacement of the electrode tool 2 is accomplished by a position detector 30 which measures the difference between the axial position of the tool and the axial position of a moveable rod 31, whose axial displacement is controlled by a motor $M_3$. The signal representative of the difference is supplied to the input of a differential amplifier 32 providing an output signal controlling the speed of the motor $M_3$. In this manner, the displacement of the rod 31 follows, with a predetermined delay, the axial displacement of the electrode tool 2.

A second position detector 33 measures the difference between the axial position of the rod 31 and a fixed, but adjustable, position defined by the stationary element of the detector 33. A signal representative of this difference is applied to the other input of the differential amplifier 32 through an amplifier 34, in order to prevent the rod 31 from being displaced beyond an axial predetermined position. As soon as such a position is reached, the output signal from the detector 30 increases proportionally to the penetration of the tool within the workpiece, and as soon as the value G increases beyond the reference value $G_o$, the eccentricity of the translation motion varies as a function of the progression of the machining in a ratio defined by the position of the slider of the potentiometer 22, as previously explained.

The arrangement of FIG. 2 comprises a single servo motor $M_2$ for displacing the workpiece, or the electrode tool, according to a transverse translation motion. The transverse translation motion is effected at a speed $\omega$ determined by the potentiometer 19 and the amount of eccentricity of the transverse translation motion is controlled by a command signal C developed at the output of an op. amp. differential amplifier 35. The servo motor $M_2$ is provided with an eccentricity detector, not shown, which supplies a signal E proportional to the amount of eccentricity. An example of structure of such a type of servo motor is explained hereinafter, in further detail, with reference to FIG. 4.

The control of the amount of eccentricity of the transverse translation motion is achieved by comparing the values E and $B_2$ by means of a comparator 36 supplying at its output a signal applied to one of the inputs of the differential amplifier 35. As in the preceding embodiment, the adjustment of the amount of eccentricity is increased by means of differentiator circuits 37 and 38. This is completed by a circuit which permits to adjust the eccentricity command signal, such as to maintain the component of the axial displacement of the tool and of the eccentricity to a value equal, at all times, to the value of the signal A. This circuit takes the form of an integrating amplifier 42 having an input to which is applied a first signal, obtained at the output of a multiplier 39, which is equal to the square of the transverse displacement E, and a second input to which is applied a second signal, obtained by means of the multiplier 40, and which is equal to the square of the command signal $B_1$. The third input of the integrating amplifier 42 is supplied a third signal obtained from the multiplier 41, which is equal to the square of the value of the signal A, and which is subtracted through the integrating amplifier 42 from the sum of the two first signals. The circuits 39, 40 and 41 may be analog circuits as described in "Analog Device" volume 1, No. 2. The output signal from the integrating amplifier 42 is applied to the third input of the amplifier 36, such as to maintain to zero the difference between the three signals.

Figure 3:
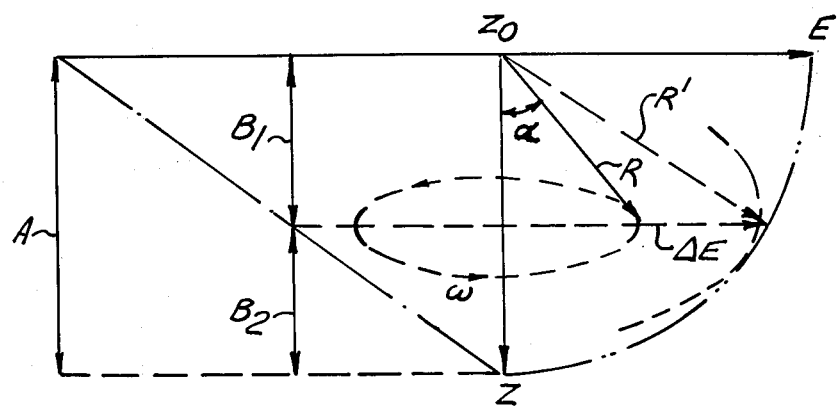
FIG. 3 is a diagram useful in explaining the operation of the invention.

FIG. 3 is a diagram useful in illustrating the operation of the devices illustrated at FIGS. 1 and 2.

The value A is divided in a constant ratio into a value, or vector $B_1$ and a value, or vector, $B_2$, the value $B_1$ determining the instantaneous axial position of the electrode tool relative to the workpiece and the value $B_2$ determining the instantaneous amount of eccentricity of the translation motion. The resultant of those two vectors of displacement measured from an initial position $Z_o$ is a displacement R forming an angle $\alpha$ with the axis of penetration of the tool within the workpiece. The angle $\alpha$ remains constant if the ratio between the values $B_1$ and $B_2$ remains constant, that is if the slider of the potentiometer 22 is held in a fixed position. It will be immediately appreciated that displacing the slider permits to change the ratio and therefore permits to vary the angle $\alpha$ between 0° and 90°. The end of the vector R describes the locus defined by a straight line (not shown) joining the points Z and E.

The differentiating amplifier 42 of FIG. 2 permits to change the amount of eccentricity by an increment $\Delta E$ such that the resultant displacement vector R' is equal to the value A. Moving the position of the slider of the potentiometer 22 thus causes displacement of the end of the vector R' along the locus defined by the circular arc ZE having a radius equal to A. When a circular translation is effected, the vector R envelopes a surface of revolution whose apex is $Z_o$ and the end of the vector R' describes a circle intersecting the surface of a hemisphere of radius A. By varying the ratio between $B_1$ and $B_2$, the vector R' describes a path upon the surface of the hemisphere.

Figure 4:
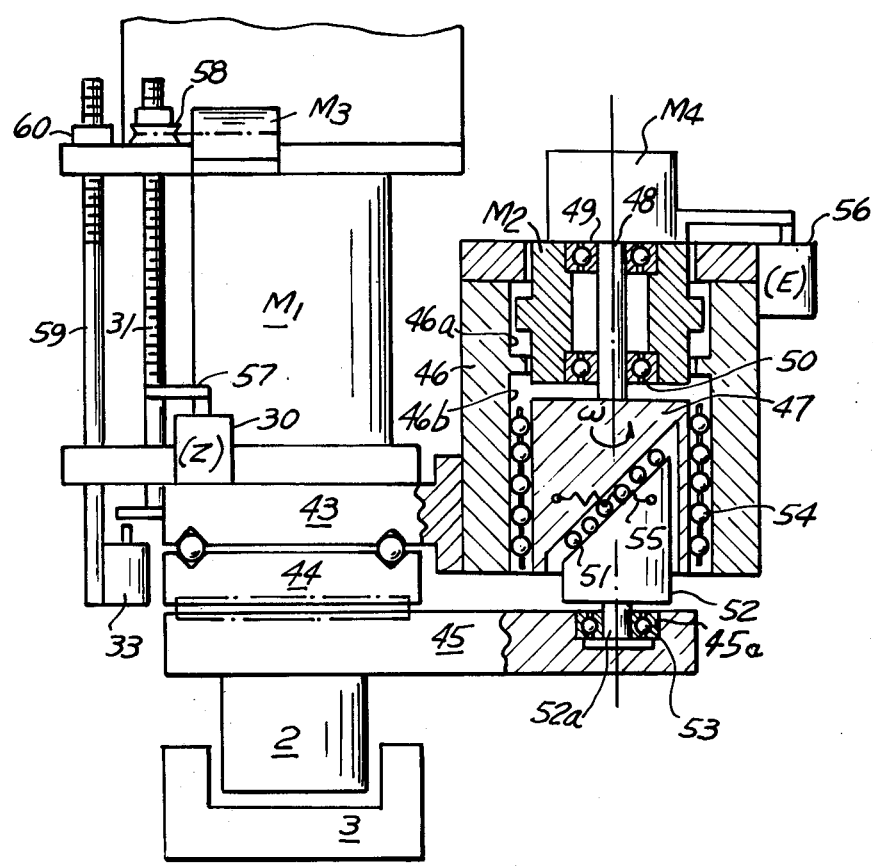
FIG. 4 illustrates an example of mechanical portion included in the arrangement of elements of FIG. 2.

FIG. 4 illustrates an example of mechanical arrangement provided with a pair of servo motors for cooperation with the schematic of FIG. 2.

The example of structure illustrated at FIG. 4 is arranged to displace the electrode tool 2 relative to the workpiece 3 according to a translation motion which can be oriented in all directions and which is controlled by the circuit whose schematic is illustrated at FIG. 2. The electrode tool 2 is mounted on the end of a ram displaced by the piston of a first hydraulic servo motor $M_1$, a cross-slide table being disposed between the ram and the electrode tool. The cross-slide table comprises a saddle 43 mounted on the end of the ram, and a pair of moveable slides 44 and 45 arranged such as to be linearly displaceable in crossed motions in directions perpendicular to the axis of penetration of the electrode tool 2 within the workpiece 3. The mechanism for displacing the slides 44 and 45 comprises a housing 46 affixed to the slide 43 and which is provided with a bore 46a in which is reciprocable the piston of servo motor $M_2$ of the second hydraulic servo motor. The piston of servo motor $M_2$ axially displaces a first camming member 47 driven in rotation by the output shaft 48 of a motor $M_4$. The axis of rotation of the camming member 47 is concentric to the piston $M_2$, the motor output shaft 48 being supported concentrically therein by ball bearings 49 and 50.

The first camming member 47 has an angled lower face which is provided with a ball linear bearing 51 disposed between the angled surface and the angled upper surface of a second camming member 52. The second camming member 52 has an axially disposed projecting shaft 52a journalled by means of ball bearing 53 in a recess 45a in the slide 45. The camming member 47 has a circularly cylindrical peripheral surface, and is held, for precision longitudinal and rotatable motion within a bore 46b of the housing 46, by means of ball bearing 54. The spring 55, interconnecting the two camming members 47 and 52, urges constantly the camming member 52 in a direction causing the axis of rotation of the shaft 52a to be aligned with the axis of rotation of the camming member 47, therefore to an initial position for which the translation motion has a nil amount of axial eccentricity.

The axial or longitudinal displacement of the piston of servo motor $M_2$ relative to the housing 46 is measured by a position transducer 56 which provides at its output a signal E indicated at FIG. 2. The threaded rod 31, which supports at its lower end the feeler 57 of the position detector 30, is axially displaced by means of a nut 58 driven by the motor $M_3$. The position transducer or detector 30 provides the signal Z shown at FIG. 2.

A second position transducer, or detector 33, whose axial position is adjustably determined by a threaded rod 59 cooperating with its corresponding adjusting nut 60, provides a signal as soon as the lower end of the rod 31 engages the feeler of the detector 33.

Although FIG. 4 illustrates, by way of example, hydraulic servo motors $M_1$ and $M_2$, it will be appreciated that other types of servo motors can be used, such as, for example, electric motors or a magnetic device, for controlling the amount of eccentricity of the electrode relative lateral translation motion.

It will also be appreciated that the signal or value A may be given a digital representation by up-counting and down-counting pulses having a frequency proportional to the difference $U_g-U_o$. In such an arrangement, the potentiometer 22 is replaced by a divider circuit dividing the digital number by a constant and adjustable value.

Having thus described the present invention by way of structural embodiments thereof, modifications whereof will be apparent to those skilled in the art, what is claimed as new is as follows:

I claim:

1. An apparatus for machining by electrical discharges an electrode workpiece by means of an electrode tool, wherein means are provided for displacing the electrodes one relative to the other both along a longitudinal axis of penetration of the electrode tool within the electrode workpiece and about a translation motion in a plane orthogonal to said longitudinal axis, said apparatus comprising means for developing a variable signal by time integrating the difference between a signal representing the machining conditions and a reference signal, means for dividing said variable signal into a first electrical signal and a second electrical signal, and means for balancing said divided electrical signals for controlling the relative position of said electrodes along said axis of penetration and the amount of eccentricity of the translation motion respectively as a function of said first electrical signal and said second electrical signal.

2. The apparatus of claim 1 comprising a voltage divider to which said variable signal is applied, said first electrical signal and said electrical signal being respectively proportional to the voltage measured between the slider of said voltage divider and one of the terminals of said voltage divider, and to the voltage between said slider and the other terminal of said voltage divider.

3. The apparatus of claim 1 further comprising a first servo motor controlled as a function of the difference between said first electrical signal and a signal representing a relative position of the electrodes along said axis of penetration; and at least one second servo motor controlled as a function of the difference between a signal proportional to said second electrical signal and a signal representative of the amount of eccentricity of the translation motion.

4. The apparatus of claim 3 comprising controlably variable eccentric means for determining the eccentricity of said translation motion, wherein said second servo motor controls the amplitude of said amount of eccentricity.

5. The apparatus of claim 1 further comprising means for measuring the amplitude of the resultant of the electrodes relative longitudinal displacement and of the electrodes relative radial displacement from a reference position, and means for varying at least one of said electrical signals as a function of the error between said resultant and the amplitude of said variable signal such as to maintain the amplitude of said resultant to a value equal to said variable signal, and means for periodically varying the division between said electrical signals in the course of a machining operation.

6. The apparatus of claim 1 further comprising means for reversing the direction of at least one of said first and second electrical signals.

* * * * *